UNITED STATES PATENT OFFICE.

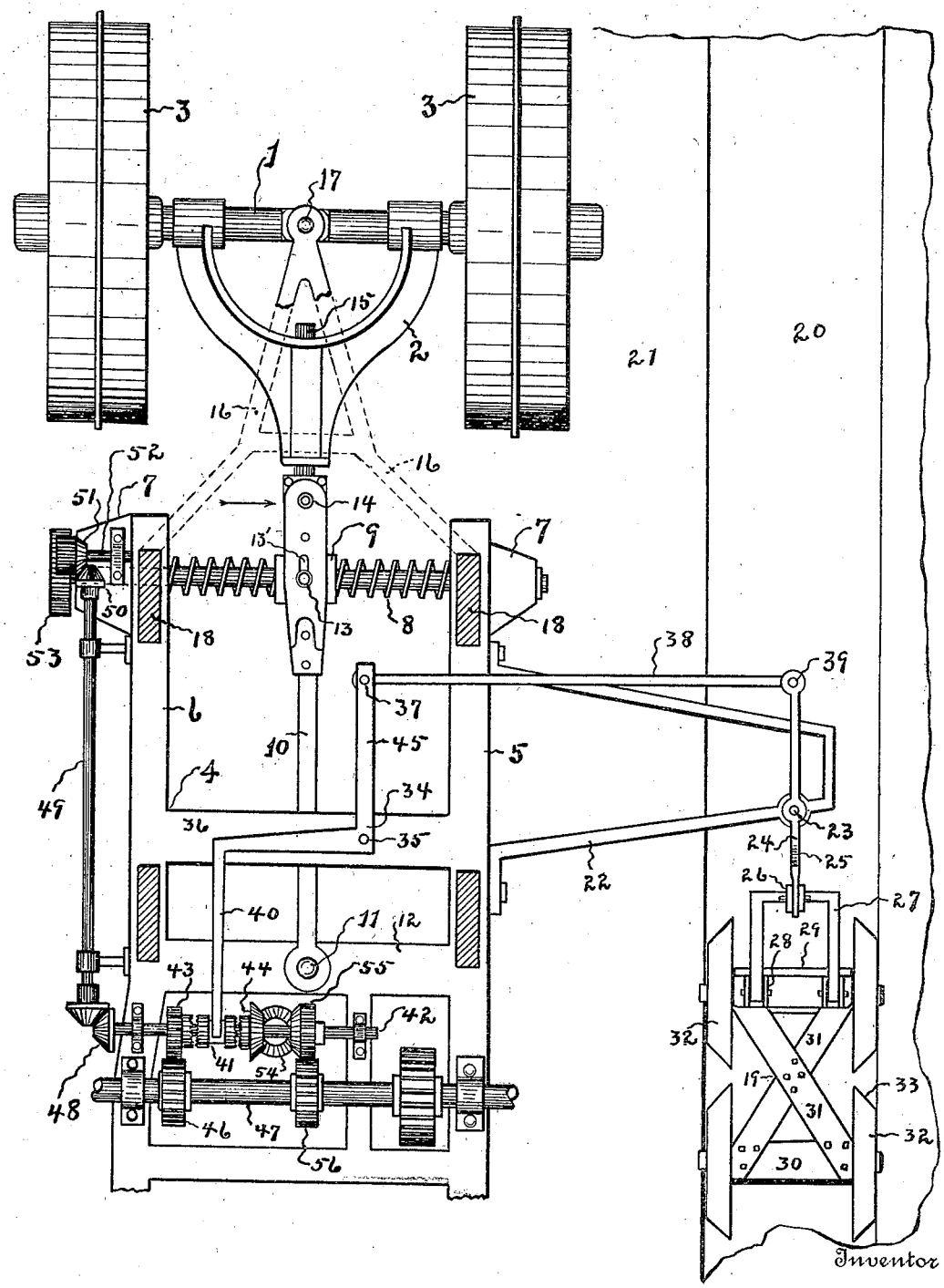

CHARLES A. PRINZ, OF CHALCO, NEBRASKA.

AUTOMATIC STEERING MEANS FOR PLOW-ENGINES.

952,017.  Specification of Letters Patent.  Patented Mar. 15, 1910.

Application filed November 5, 1909. Serial No. 526,357.

*To all whom it may concern:*

Be it known that I, CHARLES A. PRINZ, a citizen of the United States, residing at Chalco, in the county of Sarpy and State of Nebraska, have invented certain new and useful Improvements in Automatic Steering Means for Plow-Engines, of which the following is a specification.

This invention relates to a steering device for use in connection with traction engines and other like draft vehicles employed for moving gang plows, and has for its object to provide a comparatively inexpensive apparatus which may be conveniently mounted upon vehicles or engines of this class. When using these engines for plowing, in addition to the service of a fireman or engineer, an operator has been required to manually guide or steer it.

One of the objects of the invention is to provide steering means which will operate automatically, to the end that manual steering may be dispensed with and expense in operation thereby reduced, said steering means to be reliable for guiding the vehicle or engine so that it will move upon the land at a uniform distance from the furrow.

With these and other objects in view the invention presents a novel combination and arrangement of parts as described herein and claimed, and as illustrated in the drawing.

The single figure of the drawing is a plan view of the front part of a traction engine with my automatic steering means mounted thereon, the frame being partly broken away and parts shown in section.

Referring now to the drawing for a more particular description, numeral 1 indicates the front axle, 2 the axle-yoke and 3 the front wheels of a traction engine. The frame of the vehicle body 4 may comprise side plates or supports 5 and 6, and suitable cross plates suitably connected therewith.

Revolubly mounted in brackets 7 upon the free ends of the parallel side plates 5 and 6, rearwardly of wheels 3, and extending between the side plates, is a screw 8 having a rider member or sleeve 9, said member being internally threaded in the usual manner for longitudinal movement upon the screw, when the latter is rotated.

At 10 is indicated a reach or lever having its rear end pivotally mounted at 11 upon the frame, midway between side plates 5 and 6 upon cross piece 12, said lever being secured near its front end upon rider member 9, by means of bolt 13 seated in slot 13', its front end being pivotally mounted at 14 upon the sliding rod or bolt 15.

It will be understood that frame 4 shown in the drawing is a part of the underframe of a traction engine, now generally employed for drawing gang plows. A part of the upper frame is indicated at 16 in dotted lines, whereby a connection is made between the axle and the underframe, the front end of frame 16 being pivotally mounted at 17, midway between the ends of the axle, its rear end having a rigid connection with uprights 18.

The parts above described have been in general use in the construction of traction engines, and as is apparent, if screw 8 is rotated it will cause a movement of the sleeve or rider 9 longitudinally of said screw, and will thereby move the front end of lever 10 and cause a sidewise swinging movement of said lever.

In the movement of the vehicle or engine, so long as the horizontal sliding-bolt 15 is in alinement with the pivotal mountings 14 and 17, wheels 3 will move in a direction parallel with the line of draft. And it is obvious that a sidewise swinging movement of lever 10 will cause a reversely swinging movement of bolt 15, and will cause yoke 2 to swing in the same direction as bolt 15, thereby causing wheels 3 to swing horizontally in a direction the reverse to that of lever 10, the rear end of yoke 2 providing a sheath or housing within which bolt 15 may slide.

In order that means may be provided which will operate automatically to guide the engine so that its body or frame will move at a uniform distance from the furrow, I employ a drag or follower 19, which may have a suitable width to correspond with the width of the furrow 20, and devices are employed so that the vehicle or engine will be steered thereby while propelled upon the land or unplowed ground 21.

Upon side plate 5 is mounted a horizontal support or bracket 22 which may have any suitable length or form so that it will provide a pivotal mounting 23 for rock-bar 24. The rear end of bar 24, preferably, is curved downwardly at 25, and is pivotally mounted at 26 upon the front end of yoke 27, the terminals of the yoke being pivotally mounted at 28 upon the front axle 29 of the follower. The rear axle 30 is connected rigidly with the front by means of cross bars 31 and wheels or disks 32 have their treads 33 formed convergent, from their inner to their outer edges.

While I do not limit myself to exactness, the construction as described is preferred since the shape of the disks tends to prevent the follower from leaving the furrow and causes it to operate as a reliable furrow engaging device; the pivotal mountings 26 and 28 are such that the connecting yoke 27 may have a vertically swinging movement when passing over obstructions within the furrow, a horizontal swinging movement being prevented, whereby the parallel arms of the yoke are at all times disposed parallel with the line of draft of the follower.

At 34 is indicated a bell crank, the same being mounted at 35 upon the arch or cross piece 36 of frame 4, the terminal of one of its arms having a pivotal mounting 37 with the inner end of link or actuating-rod 38, the outer end of the link being pivotally mounted at 39 upon the front end of rock bar 24. The opposite end of the bell crank has a finger or extension 40 disposed in the groove of clutch 41 mounted upon the horizontal actuating shaft 42, said shaft being mounted in suitable bearings upon and disposed transversely of the frame.

Idler pinions 43 and 44 are seated upon shaft 42 adjacent to the clutch, and in operation, if the vehicle moves substantially parallel with the furrow the clutch will remain out of engagement with the gears or pinions mentioned. If, however, the wheels move in a direction toward the furrow during a forward movement, it is obvious that frame 4 will be moved nearer to said furrow, and link 38 will be moved outwardly from frame 4. Since arm 45 of the bell crank will then swing outwardly, finger 40 will cause the clutch to engage pinion 43, thereby causing the front end of lever 10 to move in the direction indicated by the arrow, and causing wheels 3 to move in a direction outwardly from the furrow.

The outward movement of wheels 3 just described, resulting from engagement of the clutch with pinion 43 is occasioned by reason of the meshing of said pinion 43 with pinion 46 of shaft 47. Shaft 47 may be the drive shaft of the motor or engine, and during operation, is in constant rotation. Shaft 42 may have a pinion 48 in engagement with the pinion upon the rear end of shaft 49, this last named shaft being suitably supported upon and disposed longitudinally of frame 4; and upon the front end of shaft 49 is provided pinion 50 in engagement with pinion 51 of shaft 52. Screw 8 is provided with pinion 53, said pinion being in engagement with pinion 51, whereby the screw is rotated to cause its rider 9 to move in the direction of side plate 5 of the frame, with the result as stated, that the vehicle or draft engine will be guided or steered, the front part of wheels 3 being moved outwardly from the furrow.

Pinion 44 is mounted as an idler upon shaft 42 and, by operation of the clutch, rotates in a direction reversely to that of pinion 43 for the reason that it is in engagement with the intermediate bevel gear wheel 54 mounted as an idler and supported in any suitable manner for this engagement. The intermediate gear wheel 54 is in engagement with pinion 55 mounted as an idler upon shaft 42, pinion 55 being in engagement with pinion 56 of shaft 47.

The devices described are effective for a control of wheels 3 and while these wheels move forwardly they are maintained parallel with the furrow, whereby the engine is automatically steered.

The particular arrangement of gearing and connections therefor as above described is not important, and I do not limit myself to exactness of details. The invention consists, broadly, of a furrow-engaging member connected with the front wheels of a draft engine when used for plowing, so that automatic steering may be effected.

In operation, the traction engine is propelled in the usual manner, and wheels 3, while moving forwardly, are maintained parallel with the furrow since follower 19 by reason of its construction and seating in the furrow resists any outward or inward movement of supporting arm 22, whereby link 38 will be actuated to the extent that it will be moved in the same direction as said supporting arm, the result being that screw 8 will be partly rotated and, thereby, the front axle will be swung to a right angle with the furrow.

Having mentioned the several parts and their function, any further description of operation is not necessary.

What I claim and desire to secure by Letters Patent is,—

The combination with a traction engine frame for drawing gang plows, said frame having a front, wheel-supported axle, of a follower member adapted to have a seating in the furrow, a supporting member upon and extending outwardly of one of the sides of said frame, a rock-bar mounted upon the supporting member, a yoke having pivotal mountings upon the follower member and said rock-bar, an actuating-rod mounted upon said rock bar; and means connected with said actuating-rod and with said axle for maintaining the axle at substantially right angles to the furrow.

In testimony whereof I have affixed my signature in presence of two witnesses.

CHARLES A. PRINZ.

Witnesses:
GEORGE W. COVELL,
HIRAM A. STURGES.